United States Patent
Sun et al.

(10) Patent No.: US 10,082,853 B2
(45) Date of Patent: Sep. 25, 2018

(54) USB POWER DELIVERY EXTENSION SYSTEM

(71) Applicant: LASTAR, INC., Moraine, OH (US)

(72) Inventors: Child Kuan Leok Sun, Irvine, CA (US); Everett Poffenberger, Miamisburg, OH (US); Craig Petersen, Fullerton, CA (US); Terry Smith, Springboro, OH (US)

(73) Assignee: Ortronics, Inc., New London, CT (US)

( * ) Notice: Subject to any disclaimer, the term of this patent is extended or adjusted under 35 U.S.C. 154(b) by 48 days.

(21) Appl. No.: 15/050,623

(22) Filed: Feb. 23, 2016

(65) Prior Publication Data

US 2016/0291663 A1 Oct. 6, 2016

Related U.S. Application Data

(60) Provisional application No. 62/119,449, filed on Feb. 23, 2015, provisional application No. 62/201,382, filed on Aug. 5, 2015.

(51) Int. Cl.
| | |
|---|---|
| *G06F 1/26* | (2006.01) |
| *G06F 13/10* | (2006.01) |
| *G06F 13/40* | (2006.01) |
| *G06F 13/42* | (2006.01) |
| *G06F 1/18* | (2006.01) |

(52) U.S. Cl.
CPC ............ *G06F 1/266* (2013.01); *G06F 13/102* (2013.01); *G06F 13/4022* (2013.01); *G06F 13/4282* (2013.01); *G06F 1/189* (2013.01); *G06F 13/4068* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 6,526,515 | B1 * | 2/2003 | Charles | G06F 1/266 713/300 |
| 2014/0084684 | A1 * | 3/2014 | Kung | G06F 1/266 307/19 |
| 2014/0136863 | A1 * | 5/2014 | Fritchman | G06F 1/26 713/310 |
| 2015/0091497 | A1 * | 4/2015 | Leung | H02J 7/0029 320/107 |
| 2015/0229161 | A1 * | 8/2015 | Talmola | H02J 7/0072 307/23 |
| 2015/0357834 | A1 * | 12/2015 | McLean | H02J 7/0054 307/31 |
| 2016/0094071 | A1 * | 3/2016 | Nge | H02J 7/0052 320/107 |
| 2016/0188506 | A1 * | 6/2016 | Wang | G06F 13/287 710/106 |

* cited by examiner

*Primary Examiner* — Ji H Bae
(74) *Attorney, Agent, or Firm* — McCarter & English, LLP

(57) ABSTRACT

Embodiments of a USB cable extension system is disclosed for delivering power to a device via a USB connection. The system can include converter circuitries to convert a voltage supplied via a USB connector to a different voltage for transmission over a power transmission wire and to convert a voltage received from a power transmission wire to a different voltage to be supplied to a USB connector connectable to a device to be powered.

20 Claims, 13 Drawing Sheets

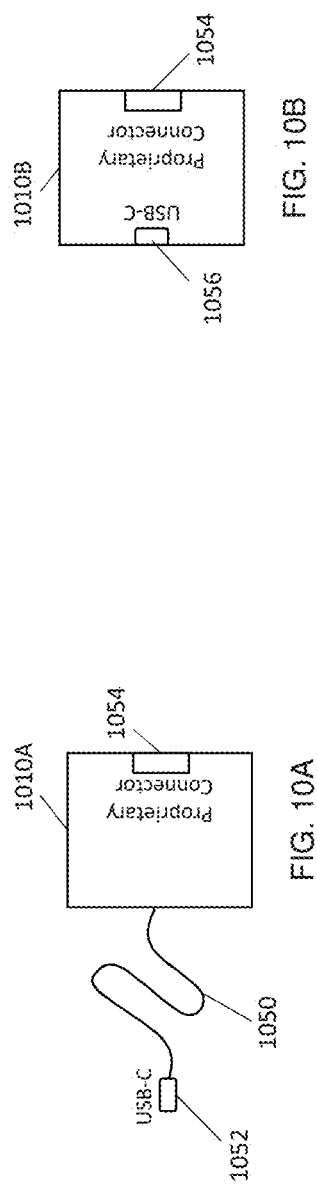
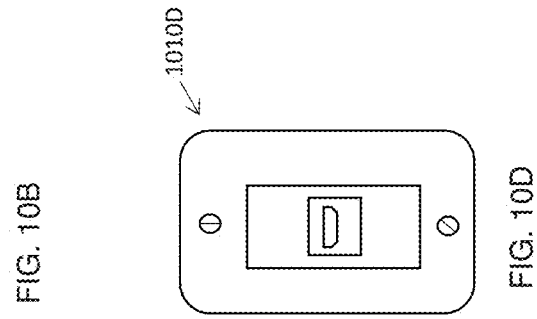
FIG. 10A
FIG. 10B
FIG. 10C
FIG. 10D

USB POWER DELIVERY EXTENSION SYSTEM

CROSS REFERENCE TO RELATED APPLICATIONS

The present application claim priority to U.S. Provisional Application No. 62/119,449, filed on Feb. 23, 2015, and U.S. Provisional Application No. 62/201,382 filed on Aug. 5, 2015, the disclosures of which are incorporated by reference herein in their entirety.

TECHNICAL FIELD

The present disclosure relates to Universal Serial Bus ("USB") cables.

BACKGROUND

In general, the use of USB cables to provide data connections between electronic devices has increased in popularity over the last decade. Today, USB cables are commonly used to connect devices, including smart phones, cameras, keyboards, mice, etc., to, for example, a desktop or laptop personal computer. In addition to data transmission, older versions of the USB specification provided for low-level power delivery that was only sufficient for charging small electronic devices. For example, the USB 2.0 specification provided for delivery of two and a half watts (2.5 W) of power, enough to charge a portable music player. The USB 3.0 specification provided for delivery of four and a half watts (4.5 W) of power, enough to charge a cell phone. The USB Battery Charging 1.2 specification provided for delivery of seven and a half watts (7.5 W) of power, enough power to charge a digital camera, but prohibited data transmission when delivering power at that level.

A USB Power Delivery specification was first released in 2012, and version 2.0 (V2.0) of the USB Power Deliver specification was released in 2014. FIG. 1 schematically depicts the architecture of a USB power delivery (PD) connection. The Power Delivery specification provides for delivery of up to one hundred watts (100 W) of power via USB cables while simultaneously transmitting data. In particular, the Power Delivery specification includes a profile— one of multiple profiles—for supply of twenty volts (20V) of voltage and five amperes (5 A) of current via a USB cable. This profile makes it possible to power laptop computers and disk drives using a USB cable. Additionally, simplified connections between devices are possible. For example, a laptop computer that was previously connected to a display device such as a flat-panel TV, e.g., by an HDMI cable, can now also be charged by the TV—which is itself powered through an AC wall outlet—without increasing the number of cables (e.g., by replacing the HDMI cable with a USB PD connection). A single USB cable can provide the necessary power and data connection between the TV and the laptop.

One advantage of the USB Power Delivery specification is that it permits power flow in both directions. As such, a connected device can act as a power source to the device at the other end of the cable and/or can act as a power sink for the other device. The two devices are able to negotiate their sink/source roles as well as the voltage and current requirements over the USB cable. In a USB cable with Type-A or Type-B connector, this negotiation is done over the same wire that delivers the power—the VBUS wire—using frequency shift key (FSK) modulation.

The recent USB 3.1 specification defines a new Type-C connector. Unlike the Type-A and Type-B plugs, the Type-C plug does not have to be oriented in particular top-bottom configuration to mate with the socket. USB cables that have Type-C connectors have a separate wire known as the configuration channel (CC) that is used—instead of VBUS—for the negotiation of power-requirements between connected devices.

The availability of true power delivery over USB cables makes longer runs of cable more desirable. Currently, a typical USB cable is three to ten feet in length. However, with the USB PD specification, it may now be desirable to connect a display such as a flat-panel TV to a laptop computer that is operated by a user sitting on a couch at the opposite end of the room from a display. Similarly, the display may be connected to a disk drive that is located in a discrete location in another part of the room. As such, longer cable lengths for USB cables become more desirable. For example, for a particular application a 100-foot cable may be desirable.

With longer cable runs, the voltage drop over the distance of the cable presents a problem, especially at higher currents. FIG. 2 schematically shows a USB cable connected to a power consuming device. The cable contains two power wires—VBUS and Gnd—connected to both the power supply and the consumer device to create a circuit loop. If the gauge of the wires are AWG#22 wires (dia. 0.644 mm) and each wire is one hundred feet long (100 ft.), then each wire will have a resistance of approximately one and six tenths ohms (1.6Ω). If the power supply is twenty volts (20V) and the current draw of the system at twenty volts (20V) is five amperes (5 A), then the voltage drop across each wire is eight volts (8V) according to Ohm's law (5 A*1.6Ω=8V). The combined voltage drop across the cable is sixteen volts (16V) (e.g., 2*8V=16V). This only allows for a four volt (4V) voltage drop across the device, which is below the voltage rating for most electronic devices. If the gauge of the wires are AWG#18 wires (dia. 1.024 mm), then each one hundred foot (100 ft.) wire will have a resistance of approximately six tenths ohms (0.60Ω). In that case, for a twenty volt (20V) power supply and five amperes (5 A) of current, the combined voltage drop across both wires in the cable would be approximately six volts (6V). This allows for a fourteen volt (14V) voltage drop across the consumer device, which is enough for some but not all consumer applications. For example, more than fourteen volts (14V) is generally required to charge a laptop battery.

Another power delivery profile supported by the USB Power Delivery specification is ten watts (10 W) of power at five volts (5V) and two amperes (2 A). For this profile, a one hundred foot (100 ft.) USB cable using two AWG#22 gauge power wires requires approximately a six and four tenths volt (6.4V) voltage drop across its length (2*2 A*1.6Ω=6.4V), which means it cannot work with a five volt (5V) power source. A one hundred foot (100 ft.) USB cable using two AWG#18 gauge power wires would require approximately a two and four tenths volt (2.4V) voltage drop across its length, meaning that only two and six tenths volts (2.6V) is available at the consumer device. This amount of voltage is insufficient for most consumer electrical devices.

SUMMARY

Exemplary embodiments of the present disclosure advantageously provide for a USB cable extension system that facilitates power delivery using USB connectors and cables by compensating for cable impedances within the USB cable to ensure that a sufficient voltage and/or electrical current is provided to a device electrically coupled to a power receiving end of the USB cable. Exemplary embodiments can use one or more voltage converters to convert the voltage received from a device or other source to a different voltage that may be suitable for transmission of relatively long cables while reducing the effect of the impedance of the cables.

In accordance with embodiments of the present disclosure, a Universal Serial Bus power delivery system is disclosed. The system includes first converter circuitry. The first converter circuitry includes a first controller and a first voltage converter. The first controller has a first electrical interface configured to electrically couple to a CC wire of a first USB Type-C connector. The controller is configured to send and receive data via the first electrical interface. The first voltage converter has an input and an output. The first voltage converter is configured to receive a first voltage at the input and to output a second voltage at the output. The first voltage converter is configured so that (i) the input of the voltage converter is configured to be electrically coupled to a V-bus wire of the USB Type-C connector and the output of the first voltage converter is configured to be electrically coupled to a power transmission wire or (ii) the input of the first voltage converter is configured to be electrically coupled to the power transmission wire and the output of the first voltage converter is configured to be electrically coupled to the V-bus wire of the USB Type-C connector.

In accordance with embodiments of the present disclosure, a method of delivering power via a Universal Serial Bus cable is disclosed. The method includes receiving, by first converter circuitry, a first voltage and a first electrical current from a first device electrically coupled to the first converter circuitry via a V-bus wire associated with a first USB connector; and outputting, from the first converter circuitry, a second voltage and a second electrical current on a power transmission wire. The second voltage is greater than the first voltage and the second electrical current is less than the first electrical current. The method also includes receiving, by second converter circuitry, the second voltage and the second electrical current via the power transmission wire; and outputting, from the second converter circuitry, a third voltage and a third electrical current to a second device via a V-bus wire associated with a second USB connector.

In accordance with embodiments of the present disclosure, a method of delivering power via a Universal Serial Bus cable is disclosed that includes receiving, by first converter circuitry including a first voltage converter, a first voltage and a first electrical current from a first device electrically coupled to the first converter circuitry via a V-bus wire associated with a first USB connector; and outputting, from the first converter circuitry, a second voltage and a second electrical current to a second device via a V-bus wire associated with a second USB connector.

In accordance with embodiments of the present disclosure, a method of delivering power via a Universal Serial Bus cable having a USB Type-C connector at a first terminal end of the Universal Serial Bus cable and an USB Type-A connector at a second end of the Universal Serial Bus cable, is disclosed. The method includes receiving, by first converter circuitry including a first voltage converter operatively coupled to the USB Type-C connector, a first voltage and a first electrical current from a DC power injector electrically coupled to the first converter circuitry. The method also includes outputting, from the first converter circuitry to the USB Type-C connector, a second voltage and a second electrical current via a V-bus wire associated with the USB Type-C connector.

Any combination and permutation of embodiments is envisioned. Other embodiments, objects, and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

Exemplary embodiments of the present disclosure will be understood from the following detailed description when read with the accompanying Figures. In the drawings, like reference numerals refer to like parts throughout the various views of the non-limiting and non-exhaustive embodiments.

FIGS. 10A-D show exemplary form factors for housing embodiments of converter circuitry in accordance with exemplary embodiments of the present disclosure.

DESCRIPTION OF EXEMPLARY EMBODIMENTS

Exemplary embodiments of the present disclosure relate to devices, systems, methods, and computer-readable media related to power delivery using universal serial bus (USB) connectors and cables. Exemplary embodiments of the present disclosure compensate for cable impedances within USB cables to ensure that a sufficient voltage and/or electrical current is provided to device(s) electrically coupled to a power receiving end of the USB cable.

Exemplary embodiments can include one or more converter circuits that are configured to adjust the voltages and currents being transmitted over a USB cable and/or being transmitted to and/or from electronic devices operatively coupled to the USB cable. The converter circuits can be dynamically configurable to accommodate different voltage, current, and/or power ratings associated with devices to that can be operatively coupled to converter circuits and/or to accommodate USB Power Deliver standards. In exemplary embodiments, the one or more converter circuits can be integrally formed with a USB cable such that a unitary cable is provided that can be connected between device and/or can be formed as separate stand-alone devices having a housing with one or more ports for receiving connectors of one or more cables.

Figure 1:
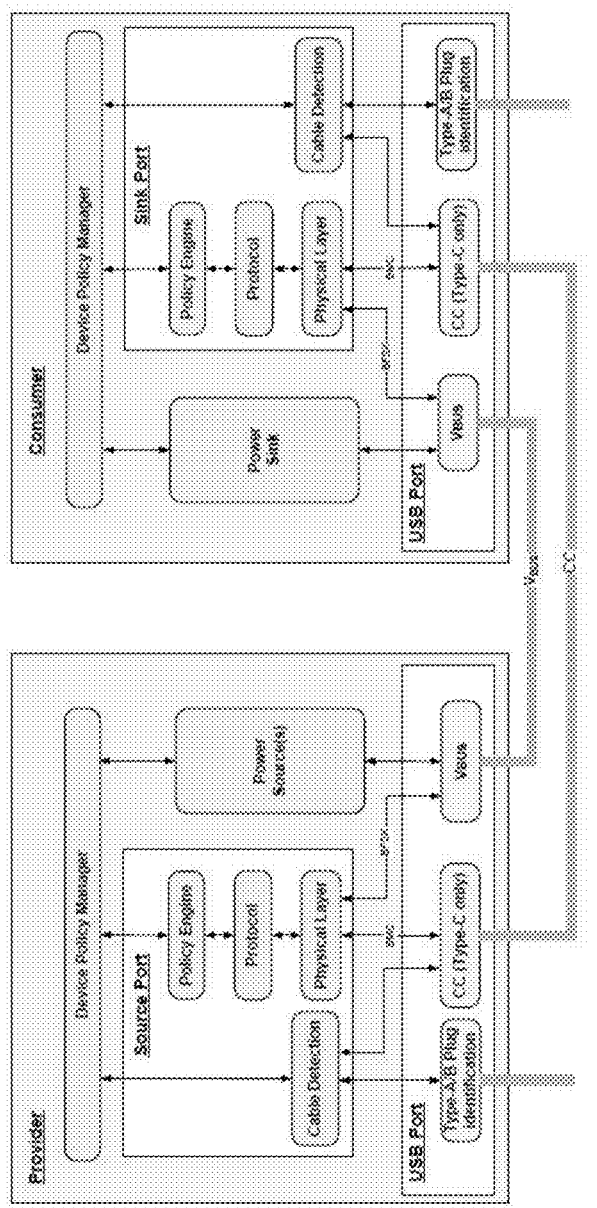
FIG. 1 (Prior Art) is a schematic depiction of the architecture of the USB Power Delivery specification.
Figure 2:
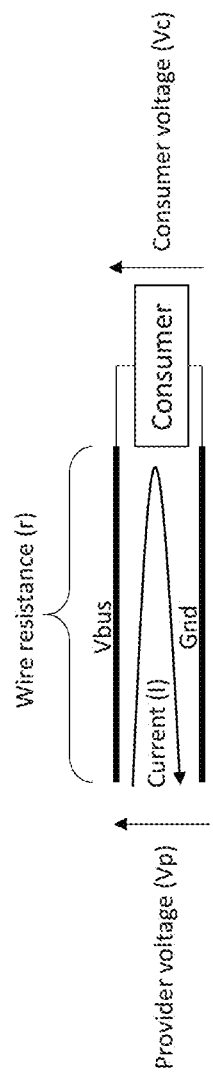
FIG. 2 (Prior Art) is a schematic depiction of the power wires inside of a USB cable.
Figure 3:
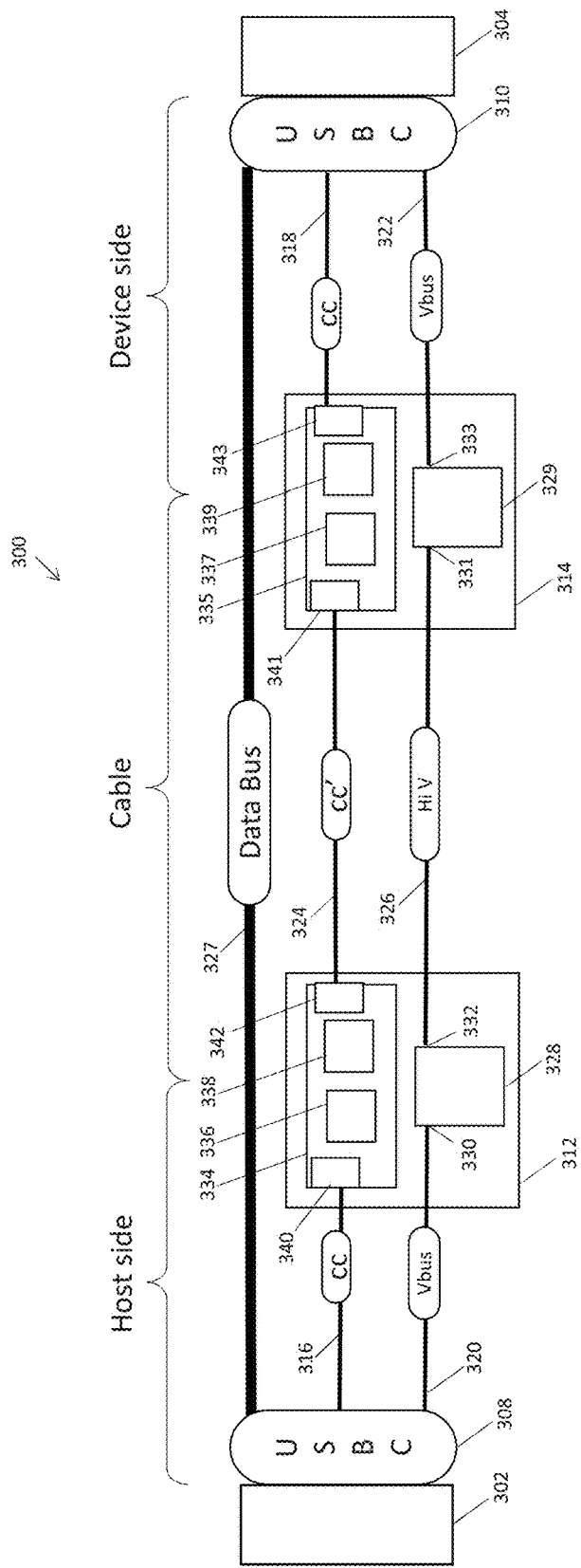
FIG. 3 is a schematic depiction of a USB connection with a power-delivery extender according to an embodiment of the present disclosure.

FIG. 3 shows a schematic representation of a USB cable extension system 300 making a USB connection between a first device 302 having a first USB port 308 and a second device 304 having a second USB port 310. USB ports 308 and 310 are Type-C ports that each have two configuration channel (CC) pins and four VBUS pins. The cable extension system 300 includes first converter circuitry 312 and second converter circuitry 314. In exemplary embodiments, the first converter circuitry 312 and second converter circuitry 314 can each be disposed within a respective housing or other suitable structure (e.g., having connectors and/or ports to facilitate electrically coupling the converter circuitry 312, 314 to other connectors, ports and/or devices). The devices 302, 304, the ports 308, 310 and the converter circuitry 312, 314 are all partially or fully compliant with the USB Power Delivery specification. The converter circuitry 312, 314 can be connected to each other and to ports 308, 310 in different ways, as described below.

The connections between ports 308, 310 and their respective converter circuitry 312, 314 each contain a CC wire 316, 318 that is connected to a CC pin on their respective port for data communication between the port and the converter circuitry and a VBUS wire 320, 322 that is connected to a VBUS pin on their respective port for power transmission between the port and the connector circuitry. The connection between the converter circuitry 312 and 314 contain a CC communication channel (through the CC' connection 324 whose physical media is not necessarily copper wires) for data transmission between converter circuitry 312 and 314 and a power transmission or high voltage wire 326 for power transmission between the converter circuitry 312 and 314. It should be understood that VBUS wires 320, 322 and high voltage wire 326 have associated ground wires (not shown) that make up a return path for the power-delivering current. A data bus 327 runs between ports 308, 310. The data bus 327 is shown logically as unbroken, i.e., not passing through the converter 312 and 314, but it should be understood that physically the bus can be made up of wires in the connection between port 308 and the converter circuitry 312, the connection between circuitry 312 and 314, and the connection between converter circuitry 314 and port 310. The wires making up data bus 327 can be copper wires. Alternatively, the wires making up data bus 327 can be optical fiber.

Converter circuitry 312 includes a step-up voltage converter 328. Voltage converter has an input 330 connected to the VBUS wire and an output 332 connected to the high voltage wire 326. Voltage converter 328 is able to produce at the output a voltage that is greater than the voltage at the input. Converter circuitry 312 also includes a controller 334 that includes a microprocessor 336, a memory 338, a CC wire interface 340 and a CC communication channel interface 342. Controller 334 can send and receive information/data on CC wire 316 and can send and receive information/data on CC communication channel (through the CC' connection 324). Controller 334 can also control voltage converter 328 to control the amount of voltage step up. Alternatively, voltage converter 328 can provide only a fixed step-up of the voltage without controlled adjustment.

Converter circuitry 314 includes a step-down voltage converter 329. Voltage converter 329 has an input 331 connected to the high voltage wire 326 and an output 333 that is connected to VBUS wire 322. Voltage converter 329 is able to produce a voltage at output 333 that is less than the voltage at the input 331. Converter circuitry 314 also includes a controller 335 that includes a microprocessor 337, a memory 339, a CC wire interface 343, and a CC communication channel interface 341. Controller 335 can send and receive information/data on CC wire 318 and can send and receive information/data on the CC communication channel (through the CC' connection 324). Controller 335 can also control voltage converter 329 to control the amount of voltage step down and/or control maximum current available at the output 333. Alternatively, voltage converter 329 can provide only a fixed step-down of the voltage without controlled adjustment.

As a non-limiting example, the voltage converter 328 can be configured to step up an input voltage received by the voltage converter 328 to, for example, sixty volts 60V. If the input power has the power profile twenty volts (20V), five amperes (5 A), then the current in the circuit on the output side of the voltage converter 328 will be one and sixty-seven hundredths amperes (1.67 A) assuming the voltage converter 328 is one hundred percent (100%) efficient such that the power input to the voltage converter 328 equals the power output of the voltage converter 328. The power input is the input voltage (e.g., 20V) multiplied by the input current (e.g., 5 A), and the power output is the output voltage (e.g., 60V) multiplied by the output current. As such, the output current is approximately equal one and sixty-seven hundredths amperes (e.g., 20V*5 A/60V=1.67 A).

In an exemplary embodiment, the high voltage wire 326 and its associated ground wire are constructed using AWG#22 gauge wires (dia. 0.644 mm), which each have a resistance of one and six tenths ohms (1.6Ω) per one hundred feet (100 ft.) of length. Continuing the above non-limiting example for AWG#22 gauge wires, at one and sixty-seven hundredths amperes (1.67 A) of current, the combined voltage drop across both lengths of wire is approximately five and four tenths volts (5.4V) (e.g., 2*1.67 A*1.6Ω=5.4V). Thus, there is approximately fifty-five and six tenths volts (55.6V) available to power the output device and voltage converter 329 can be used to step down that voltage to the voltage specification for the device being powered, which could be more on the order of, for example, twenty volts (20V).

In another exemplary embodiment, the high voltage wire 326 and its associated ground wire can be constructed using AWG#18 gauge wires (dia. 0.644 mm), which has a resistance of approximately six tenths ohms (0.60Ω) per one hundred feet (100 ft.) of length. Continuing the above non-limiting example for AWG#18 gauge wires, at one and sixty-seven hundredths amperes (1.67 A) of current, the combined voltage drop across both lengths of wire is approximately 2 volts (e.g., 2*1.67 A*0.6Ω=2.0V). Thus, there is fifty-eight volts (58V) available to power the output device and voltage converter 329 can be used to step down that voltage to the voltage specification for the device being powered, which could be more on the order of, for example twenty volts (20V).

Another power delivery profile supported by the USB Power Delivery specification is ten watts (10 W) of power at five volts (5V) and two amperes (2 A). For this profile, a step up to sixty volts (60V) by voltage converter 328 results in a current of one-hundred sixty-seven milliamperes (167 mA) in the high voltage wire 326 and its associated ground wire running the one hundred foot (100 ft.) length of the USB cable. In the embodiment in which the gauge of those two wires are AWG#22, the combined voltage drop across both lengths of wire is approximately five tenths volts (0.5V) (e.g., 2*0.167 A*1.6Ω=0.5V). Thus, there is approximately fifty-nine and five tenths volts (59.5V) available to power the output device and the voltage converter 329 can be used to step down that voltage to the voltage specification for the device being powered, which could be more on the order of, for example, approximately five volts (5V). In the embodiment in which the high voltage wire 326 and its associated ground wire are AWG#18 gauge wires (dia. 0.644 mm), the combined voltage drop across both lengths of wire is approximately two tenths volts (0.2V) (e.g., 2*0.167 A*0.6Ω=0.2V). Thus, there is approximately fifty-nine and eight tenths volts (59.8V) available to power the output device and the voltage converter 329 can be used to step down that voltage to the voltage specification for the device being powered, which could be more on the order of, for example, approximately five volts (5V).

The device described in the present disclosure has multiple advantages. Power cannot be adequately delivered along a long USB cable length, such as one hundred feet (100 ft.), at the voltages provided for in the USB Power Delivery specification. The system described in the present disclosure steps up the voltage provided by the power supply so that the power can be delivered a longer distance and then steps down the voltage as required at the other end. The step up in the voltage results in a reduction in the current in most of the length of the cable. Because less current is passing the through the wires in the cable along most of its length, an additional advantage is that thinner gauge wires can be used.

Figure 4:
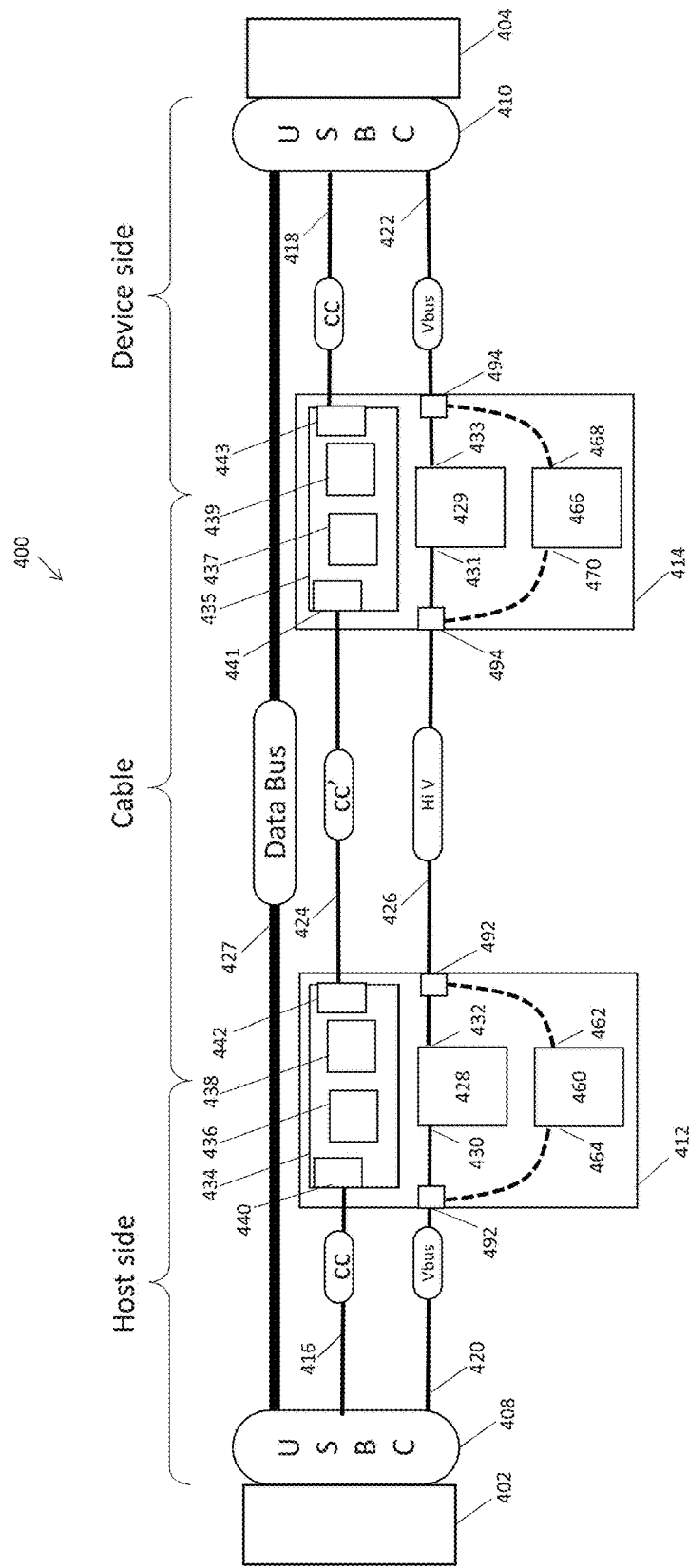
FIG. 4 is a schematic depiction of a bidirectional USB connection with a power-delivery extender according to an embodiment of the present disclosure.

FIG. 4 shows another exemplary cable extension system 400 making a USB connection between a first device 402 having a first USB port 408 and a second device 404 having a second USB port 410. USB ports 408 and 410 are Type-C ports that each have two configuration channel (CC) pins and four VBUS pins. The cable extension system 400 includes first converter circuitry 412 and second converter circuitry 414. In exemplary embodiments, the first converter circuitry 412 and second converter circuitry 414 can each be disposed within a respective housing or other suitable structure (e.g., having connectors and/or ports to facilitate electrically coupling the converter circuitry 412, 414 to other connectors, ports and/or devices). The devices 402, 404, the ports 408, 410 and the converter circuitry 412, 414 are all partially or fully compliant with the USB Power Delivery specification. The converter circuitry 412, 414 can be connected to each other and to ports 408, 410 in different ways, as described herein.

The connections between ports 408, 410 and their respective converter circuitry 412, 414 each contain a CC wire 416, 418 that is connected to a CC pin on their respective port for data communication between the port and the converter circuitry and a VBUS wire 420, 422 that is connected to a VBUS pin on their respective port for power transmission between the port and the connector circuitry. The connection between the converter circuitry 412 and 414 contain a CC communication channel (through the CC' connection 424 whose physical media is not necessarily copper wires) for data transmission between converter circuitry 412 and 414 and a power transmission or high voltage wire 426 for power transmission between the converter circuitry 412 and 414. It should be understood that VBUS wires 420, 422 and high voltage wire 426 have associated ground wires (not shown) that make up a return path for the power-delivering current. A data bus 427 runs between ports 408, 410. The data bus 427 is shown logically as unbroken, i.e., not passing through the converter 412 and 414, but it should be understood that physically the bus can be made up of wires in the connection between port 408 and the converter circuitry 412, the connection between circuitry 412 and 414, and the connection between converter circuitry 414 and port 410. The wires making up data bus 427 can be copper wires. Alternatively, the wires making up data bus 427 can be optical fiber.

The converter circuitry 412 contains a step-down voltage converter 460 in addition to step-up converter 428. The voltage converter 428 has an input 430 that can be selectively connected to the VBUS wire 420 and an output 432 that can be selectively connected to the high voltage wire 426. The voltage converter 428 is able to produce at the output a voltage that is greater than the voltage at the input. The voltage converter 460 has an input 462 that can be selectively connected to the high voltage wire 426 and an output 464 that can be selectively connected to the VBUS wire 420. The voltage converter 460 is able to produce at the output 464 a voltage that is less than the voltage at the input 462.

The converter circuitry 412 also contains switching circuitry including switches 492 for switching between the voltage converters 428 and 460. For example, one of the switches 492 can be configured to selectively connect the input 430 of the voltage converter 428 or the output 464 of the voltage converter 460 to the VBUS wire 420 and one of the switches 492 can be configured to selectively connect the output 432 of the voltage converter 428 or the input 462 of the voltage converter 460 to the high voltage wire 426. In some embodiments, the switches 492 can be formed by transistors, relays, and/or any other suitable switching devices. The switches 492 can be controlled by controller 434 to connect, via the switches 492, the input 430 and output 432 of the voltage converter 428 to the VBUS wire 420 and the high voltage wire 426, respectively, while the input 462 and the output 464 of the voltage converter 460 can be electrically isolated from the VBUS wire 420 and the high voltage wire 426 or to connect, via the switches 492, the input 462 and output 464 of the voltage converter 460 to the high voltage wire 426 and the VBUS wire 420, respectively, while the input 430 and the output 432 of the voltage converter 428 can be electrically isolated from the VBUS wire 420 and the high voltage wire 426.

The controller 434 can include a microprocessor 436, a memory 438, a CC wire interface 440 and a CC communication channel interface 442. The controller 434 can send and receive information/data on the CC wire 416 and can send and receive information/data on the CC communication channel (through the CC' connection 424). The controller 434 can control an amount of step-up voltage is generated by the voltage converter 428. The controller can control an amount of step-down voltage is generated by the voltage converter 460 and/or control a maximum current available at the output 464 of the voltage converter 460. Alternatively, the voltage converter 428 and/or the voltage converter 460 can provide only a fixed step-up voltage and/or step down voltage, respectively, without controlled adjustment.

The converter circuitry 414 contains a step-up voltage converter 466 in addition to step-down converter 429. The voltage converter 429 has an input 431 selectively connected to the high voltage wire 426 and an output 433 that is selectively connected to VBUS wire 422.

The voltage converter 429 is able to produce a voltage at output 433 that is less than the voltage at the input 431. The voltage converter 466 has an input 468 selectively connected to VBUS wire 422 and an output 470 that is selectively connected to the high voltage wire 426. The voltage converter 466 is able to produce a voltage at output 470 that is greater than the voltage at the input 468.

The converter circuitry 414 also contains switching circuitry including switches 494 for switching between the voltage converters 429 and 466. For example, one of the switches 494 can be configured to selectively connect the input 431 of the voltage converter 429 or the output 470 of the voltage converter 466 to the high voltage wire 426 and one of the switches 494 can be configured to selectively connect the output 433 of the voltage converter 429 or the input 468 of the voltage converter 466 to the VBUS wire 422. In some embodiments, the switches 494 can be formed by transistors, relays, and/or any other suitable switching devices. The switches 494 can be controlled by controller 435 to connect, via the switches 494, the input 431 and output 433 of the voltage converter 429 to the high voltage wire 426 and the VBUS wire 422, respectively, while the input 468 and the output 470 of the voltage converter 466 can be electrically isolated from the VBUS wire 422 and the high voltage wire 426 or to connect, via the switches 494, the input 468 and output 470 of the voltage converter 466 to the VBUS wire 420 and the high voltage wire 426, respectively, while the input 431 and the output 433 of the voltage converter 429 can be electrically isolated from the VBUS wire 422 and the high voltage wire 426.

The controller 435 can include a microprocessor 437, a memory 439, a CC wire interface 443, and a CC communication channel interface 441. The controller 435 can send and receive information/data on CC wire 418 and can send and receive information/data on the CC communication channel (through the CC' connection 424). The controller 435 can also control voltage converter 429 to control an amount of step-down voltage generated by the voltage converter 429 and/or control a maximum current available at the output 433 of the voltage converter 429. The controller 435 can also control the voltage converter 466 to control an amount of step-up voltage generated by the voltage converter 466 Alternatively, the voltage converters 429 and 466 can provide only a fixed step-down and step-up of the voltages, respectively, without controlled adjustment.

Figure 5:
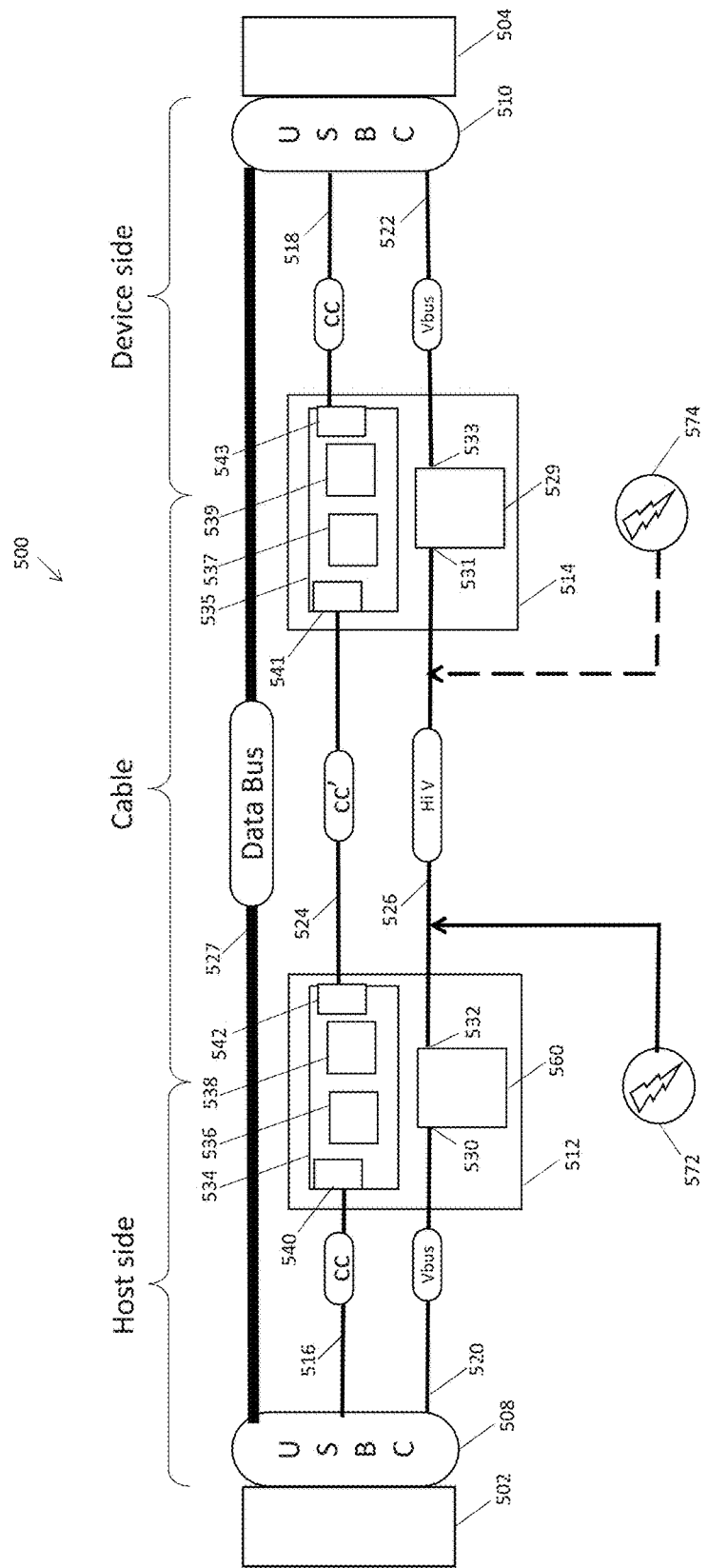
FIG. 5 is a schematic depiction of a USB connection with a power-delivery extender including DC power injectors according to an embodiment of the present disclosure.

FIG. 5 shows another exemplary cable extension system 500. In the system 500 shown in FIG. 5, converter circuitry 512 includes controller 534 and step down converter 560 and converter circuitry 514 includes controller 535 and step-down converter 529.

With reference to the converter circuitry 512, the controller 534 includes microprocessor 536, a memory 538, a CC wire interface 540 and a CC communication channel interface 542. The controller 534 can send and receive information/data on CC wire 516 and can send and receive information/data on CC communication channel (through the CC' connection 524). The controller 534 can also control voltage converter 560 to control the amount of voltage step down. Alternatively, voltage converter 560 can provide only a fixed step-down of the voltage without controlled adjustment.

With reference to the converter circuitry 514, the controller 535 includes microprocessor 537, a memory 539, a CC wire interface 541 and a CC communication channel interface 543. The controller 535 can send and receive information/data on CC wire 518 and can send and receive information/data on CC communication channel (through the CC' connection 524). The controller 535 can also control voltage converter 529 to control the amount of voltage step down. Alternatively, voltage converter 529 can provide only a fixed step-down of the voltage without controlled adjustment.

A DC power injector 572 can provide a power supply at an elevated voltage to the high voltage wire 526 to power devices 502 and/or 504 via the step down converters 560 and 529. The DC power injector 572 can be physically located within or external to the converter circuitry 512. In such case, raising the voltage just for the purpose of power transmission may not be required if only port 508 and not port 510 consumes power. When both ports 508 and 510 consume power, raising the voltage for purposes of power transmission may be required if port 510 is a sufficient distance away. A second DC power injector 574 can be included within or external to the converter circuitry 514 such that the system can be powered by DC power injectors 572 and/or 574. In exemplary embodiments, the DC injectors can include a battery, a AC to DC voltage converter that receive an AC voltage and converts the AC voltage to a DC voltage that is injected into the circuitry, and/or can be another suitable DC voltage source.

Figure 6:
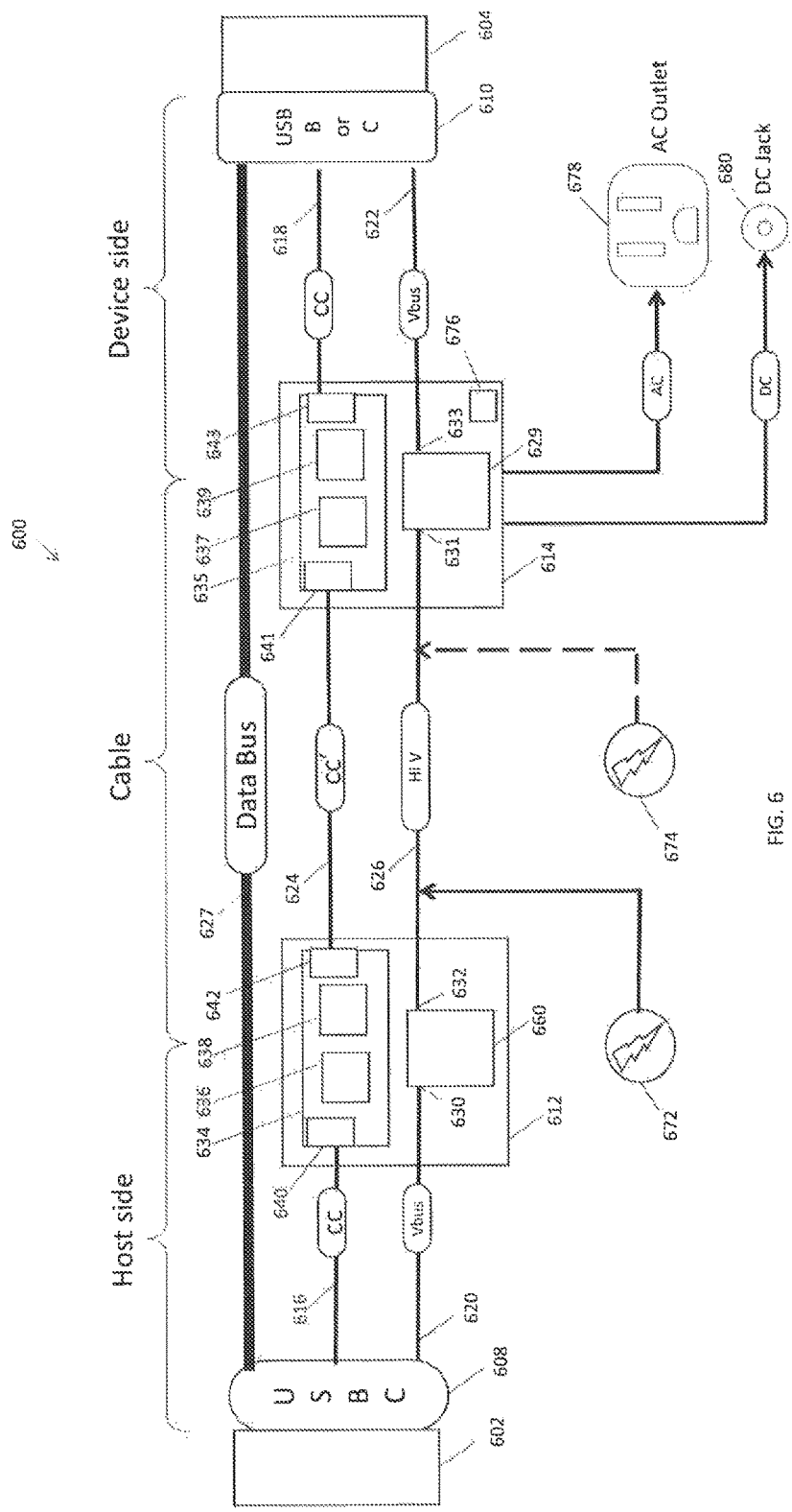
FIG. 6 is a schematic depiction of a USB connection with a power-delivery extender including DC power injectors, voltage outlets and jacks according to an embodiment of the present disclosure.

FIG. 6 shows another exemplary cable extension system 600. In the system 600 shown in FIG. 6, converter circuitry 612 includes controller 634 and step down converter 660 and converter circuitry 614 includes controller 635 and step-down converter 629.

With reference to the converter circuitry 612, the controller 634 includes microprocessor 636, a memory 638, a CC wire interface 640 and a CC communication channel interface 642. The controller 634 can send and receive information/data on CC wire 616 and can send and receive information/data on CC communication channel (through the CC' connection 624). The controller 634 can also control voltage converter 660 to control the amount of voltage step down. Alternatively, voltage converter 660 can provide only a fixed step-down of the voltage without controlled adjustment.

With reference to the converter circuitry 614, the controller 635 includes microprocessor 637, a memory 639, a CC wire interface 641 and a CC communication channel interface 643. The controller 635 can send and receive information/data on CC wire 618 and can send and receive information/data on CC communication channel (through the CC' connection 624). The controller 635 can also control voltage converter 629 to control the amount of voltage step down. Alternatively, voltage converter 629 can provide only a fixed step-down of the voltage without controlled adjustment.

A DC power injector 672 can provide a power supply at an elevated voltage to the high voltage wire 626 to power devices 602 and/or 604 via the step down converters 660 and 629. The DC power injector 672 can be physically located within or external to the converter circuitry 612. In such case, raising the voltage just for the purpose of power transmission may not be required if only port 608 and not port 610 consumes power. When both ports 608 and 610 consume power, raising the voltage for purposes of power transmission may be required if port 610 is a sufficient distance away. A second DC power injector 674 can be included within or external to the converter circuitry 614 such that the system can be powered by DC power injectors 672 and/or 674.

In the system 600, the converter circuitry 614 can supply DC power to another device besides the one connected to port 610 through DC jack 680. Additionally, the converter circuitry 614 contains a DC/AC converter 676 such that the converter circuitry 614 can supply AC power to a device through AC outlet 678. Additionally, port 610 can be a USB Type B port as well as a USB Type C port. If port 610 is a USB Type B port, then it does not have a CC pin and must advertise its power requirements to converter circuitry 614 through VBUS wire 622. Otherwise, standard low-current five vole (5V) power will be supplied.

Figure 7:
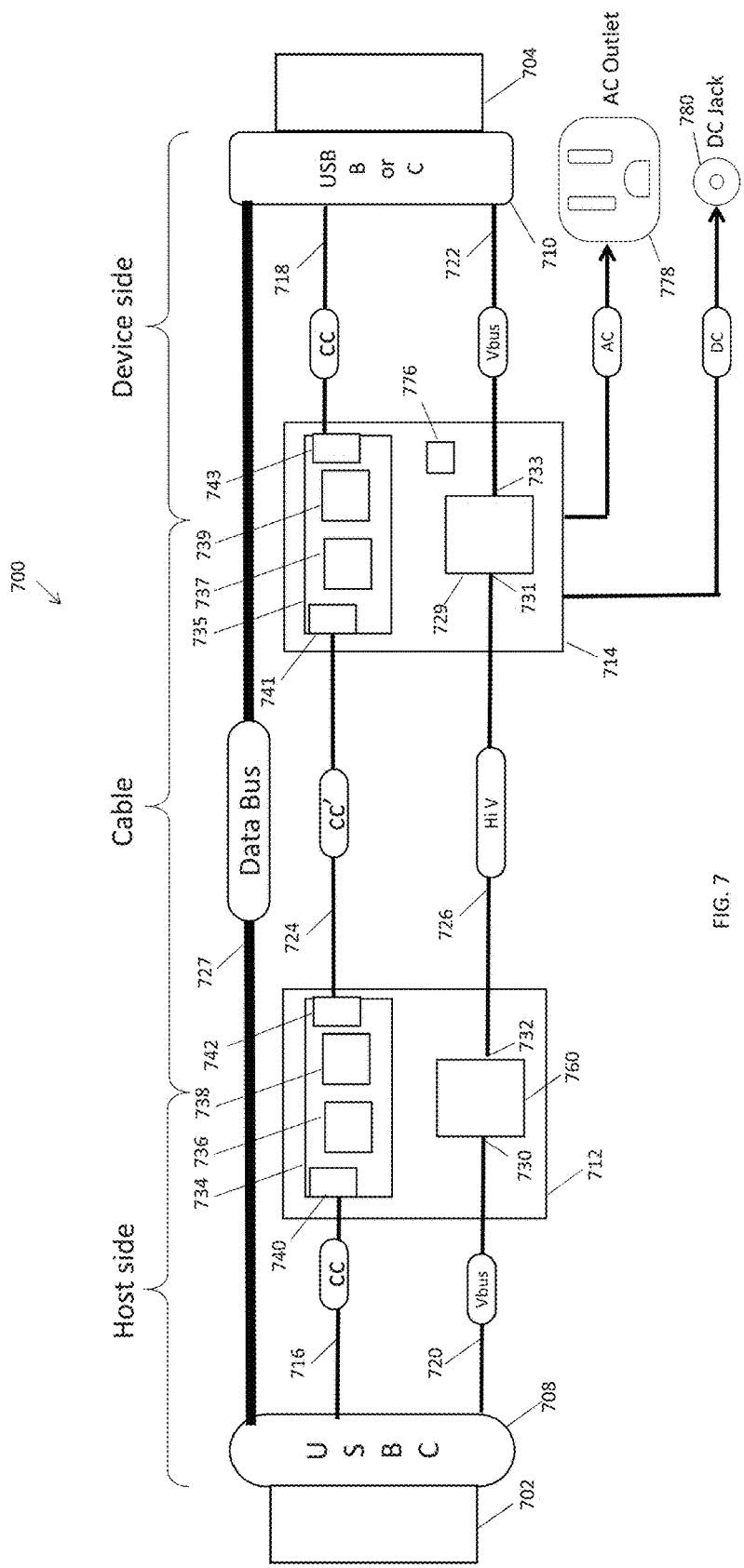
FIG. 7 is a schematic depiction of a USB connection with a power-delivery extender including voltage outlets and jacks according to an embodiment of the present disclosure.

FIG. 7 shows another exemplary cable extension system 700. In the system 700 shown in FIG. 7, converter circuitry 712 includes controller 734 and step-up converter 728 and converter circuitry 714 includes controller 735 and step-down converter 729.

With reference to the converter circuitry 712, the controller 734 includes microprocessor 736, a memory 738, a CC wire interface 740 and a CC communication channel interface 742. The controller 734 can send and receive information/data on CC wire 716 and can send and receive information/data on CC communication channel (through the CC' connection 724). The controller 734 can also control voltage converter 728 to control the amount of voltage step up. Alternatively, voltage converter 728 can provide only a fixed step-up of the voltage without controlled adjustment.

With reference to the converter circuitry 714, the controller 735 includes microprocessor 737, a memory 739, a CC wire interface 741 and a CC communication channel interface 743. The controller 735 can send and receive information/data on CC wire 718 and can send and receive information/data on CC communication channel (through the CC' connection 724). The controller 735 can also control voltage converter 729 to control the amount of voltage step down. Alternatively, voltage converter 729 can provide only a fixed step-down of the voltage without controlled adjustment.

In the system 700, the converter circuitry 714 can supply DC power to another device besides the one connected to port 710 through DC jack 780. Additionally, converter circuitry 714 contains a DC/AC converter 776 such that converter circuitry 714 can supply AC power to a device through AC outlet 778. Additionally, port 710 can be a USB Type B port as well as a USB Type C port. If port 710 is a USB Type B port, then it does not have a CC pin and must advertise its power requirements to converter circuitry 714 through VBUS wire 722. Otherwise, standard low-current five volt (5V) power will be supplied.

Figure 8:
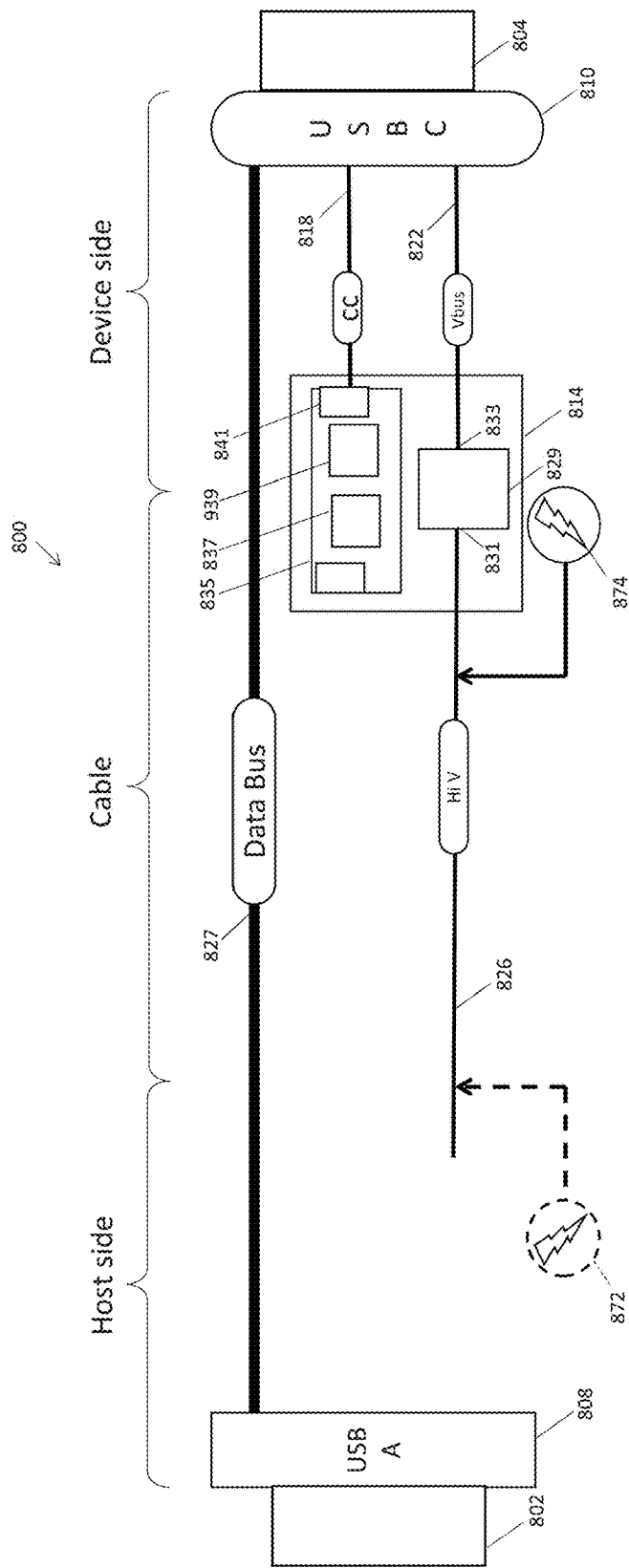
FIG. 8 is a schematic depiction of a USB connection with a power-delivery extender including DC power injectors to provide power according to an embodiment of the present disclosure.

FIG. 8 shows another exemplary cable extension system 800. Extension system 800 is similar to extension system 500 in FIG. 5, except that the host side has a USB Type A port 808 and does not have an associated converter circuit. As shown in FIG. 8, the device 804 can receive power via the converter circuitry 814 via external DC power injectors 872 and/or 874, which can inject power to the power transmission or high voltage wire 826 close to the host end or the device end. The voltage converter 829 can convert the voltage received from the DC power injectors 872 and/or 874 to a voltage usable to power or charge a device 804 (e.g., generate a step-down voltage). The connected USB Type C device 804 can draw power from the VBUS 822 based on the advertised power profile from controller 835, which includes a microprocessor 837, a memory 839, and a CC wire interface 841.

Figure 9:
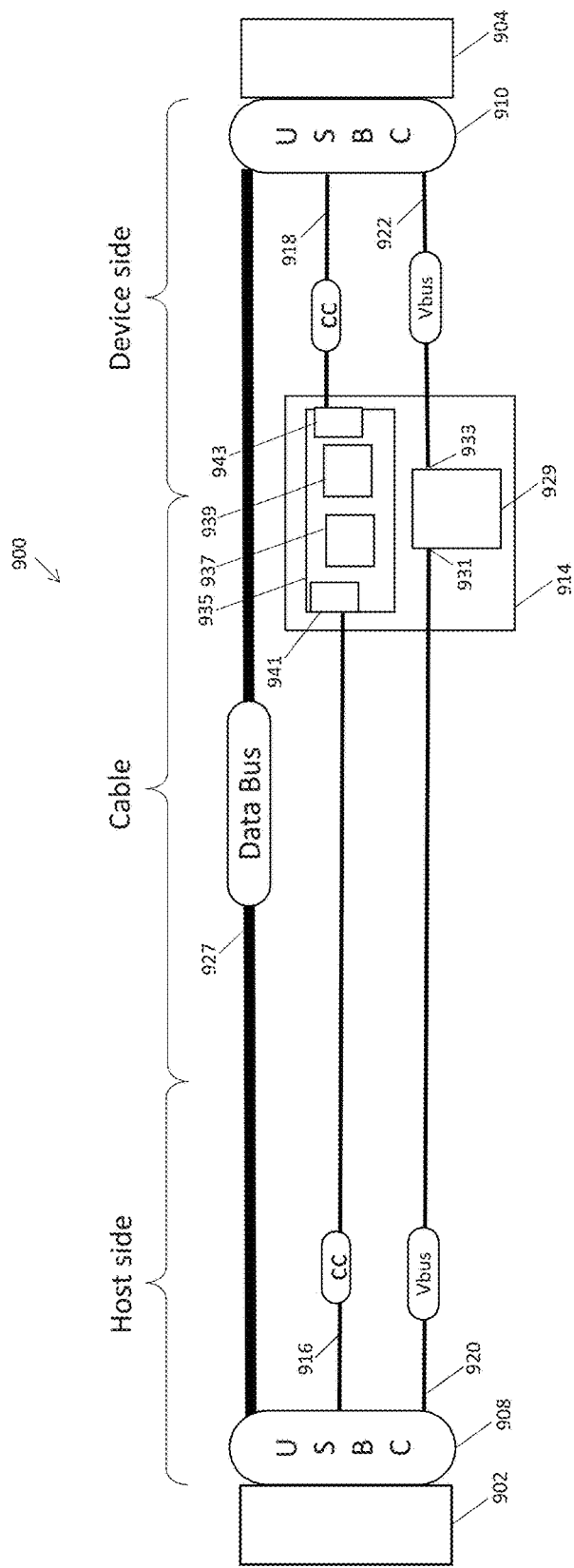
FIG. 9 is a schematic depiction of a USB connection with a power-delivery extender including a single instance of converter circuitry according to an embodiment of the present disclosure.

FIG. 9 shows another exemplary cable extension system 900. In extension system 900, a voltage converter circuitry 914 is used and includes a controller 935 and a voltage converter 929. A controller 935 has a microprocessor 937, a memory 939, a CC wire interface 941 connected with CC wire 916, and a CC wire interface 943 connected with CC wire 918. A buck-booster converter 929 converts voltage of VBUS 920 to a specific profile voltage onto VBUS 922. The controller 935 can negotiate with the first device 902 for a power profile with highest possible voltage level (e.g. 20V) to minimize the current needed for a fixed amount of power needed by the second device 904. The controller 935 then advertises to the second device 904 the power profile it can support accounting for the capability of the first device 902 and an expected amount of loss over the VBUS wire 920. For example, rather than having the first device 902 transmit power at five volts (5V) and two amperes (2 A), the controller 935 can request that the first device transmit power at twenty volts (20V) and five amperes (5 A), and the controller 935 can advertise to the second device 904 that the power will be delivered at five volts (5V) and two amperes (2 A).

FIGS. 10A-D show multiple form factors 1010A-D for housing an instance of converter circuitry (e.g., converter circuitry 312, 314, 412, 414, 512, 514, 612, 614, 712, 714, 814, and/or 914). For ease of identification, reference is made only to converter circuitry 312 shown in FIG. 3, but it should be understood that the same form factors could be used with converter circuitry 314, 412, 414, 512, 514, 612, 614, 712, 714, 814, and/or 914 as well. In FIG. 10A, a cable 1050 is attached to converter circuitry 312 on the same side of the housing 1010A as the input side of step-up converter 328. The cable 1050 has a male USB Type C plug 1052 on the opposite end to the end attached to the converter circuitry 312. Plug 1052 can connect with USB port 308 (shown in FIG. 3). The opposite side of housing containing the converter circuitry 312 includes receptacle 1054 electrically coupled to the output of the voltage converter 328 and the CC communication channel interface 342 for receiving a corresponding male connector (not shown). The male connector is part of a cable containing the CC communication channel (through the CC' connection 324) and high voltage wires 326. In FIG. 10B, cable 1050 and plug 1052 of the housing 1010A in FIG. 10A are replaced with a USB port 1056 in the housing 1010B. A USB Type C cable can connect port 308 (shown in FIG. 3) and port 1056. In FIG. 10C, receptacle 1054 shown in the housing 1010A is replaced with an attached cable containing the CC communication channel (through the CC' connection 324) and the high voltage wires 326 in the housing 1010C. In FIG. 10D, converter circuitry is mounted within housing 1010D, which can form a wall-mountable arrangement that allows the converter circuitry to be mounted inside of a wall behind a faceplate. As such, the extension cable can run through the wall.

Figure 11:
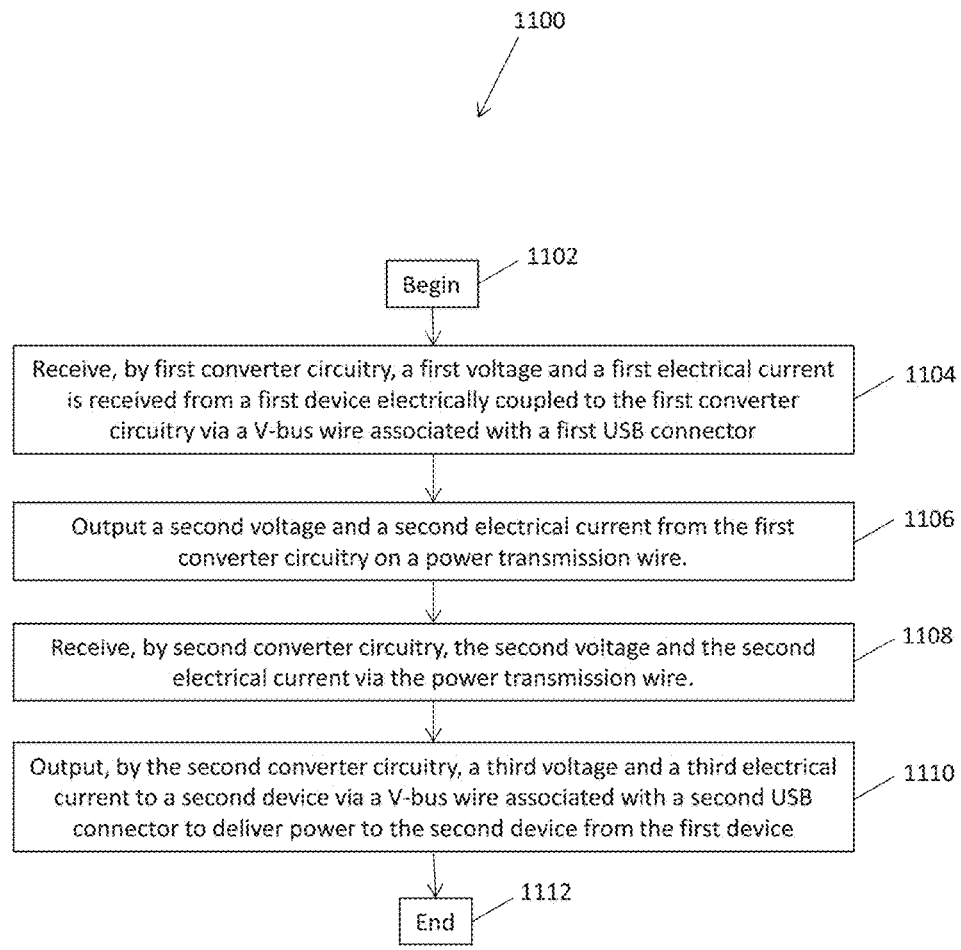
FIG. 11 is a flowchart of a non-limiting example power delivery process 1100 in accordance embodiments of the present disclosure.

FIG. 11 is a flowchart of a non-limiting example power delivery process 1100 in accordance embodiments of the present disclosure. The process 1100 begins at step 1102. At step 1104, a first voltage and a first electrical current is received by first converter circuitry from a first device electrically coupled to the first converter circuitry via a V-bus wire associated with a first USB connector. At step 1106, a second voltage and a second electrical current is output from the first converter circuitry on a power transmission wire. The second voltage is greater than the first voltage and the second electrical current is less than the first electrical current. At step 1108, the second voltage and the second electrical current can be received by second converter circuitry via the power transmission wire. At step 1110, a third voltage and a third electrical current can be output from the second converter circuitry to a second device via a V-bus wire associated with a second USB connector to deliver power to the second device from the first device. At step 1112, the process ends.

Figure 12:
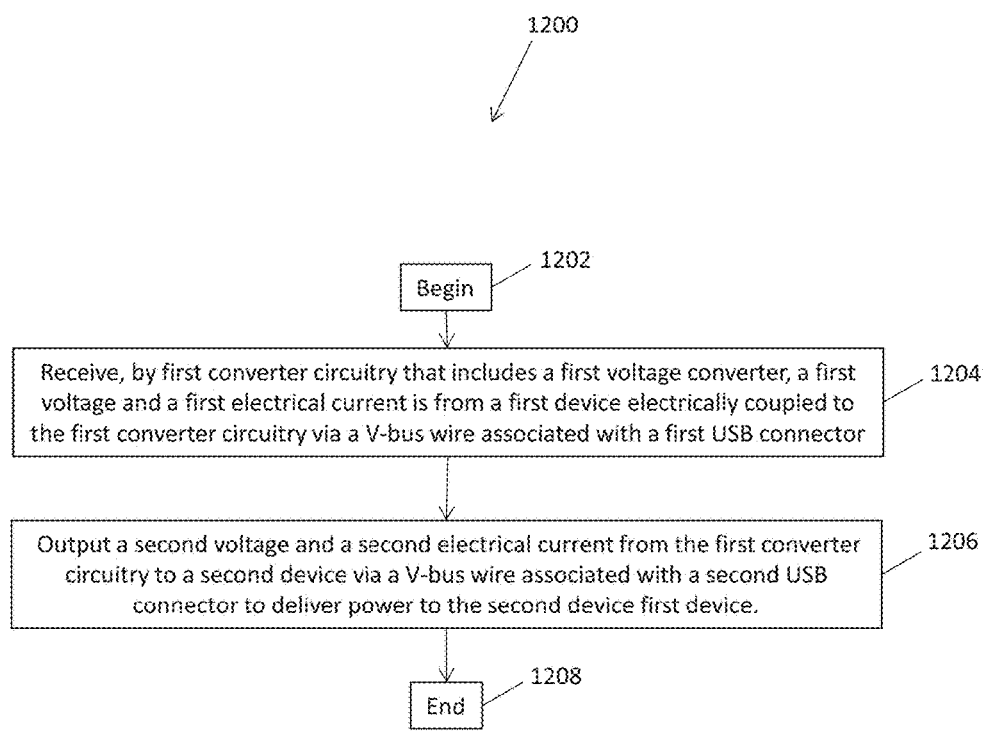
FIG. 12 is a flowchart of a non-limiting example power delivery process 1200 in accordance with embodiments of the present disclosure.

FIG. 12 is a flowchart of a non-limiting example power delivery process 1200 in accordance with embodiments of the present disclosure. The process begins at step 1202. At step 1204, a first voltage and a first electrical current is received by first converter circuitry that includes a first voltage converter from a first device electrically coupled to the first converter circuitry via a V-bus wire associated with a first USB connector. At step 1204, a second voltage and a second electrical current is output from the first converter circuitry to a second device via a V-bus wire associated with a second USB connector to deliver power to the second device first device. At step 1206, the process 1200 ends.

Figure 13:
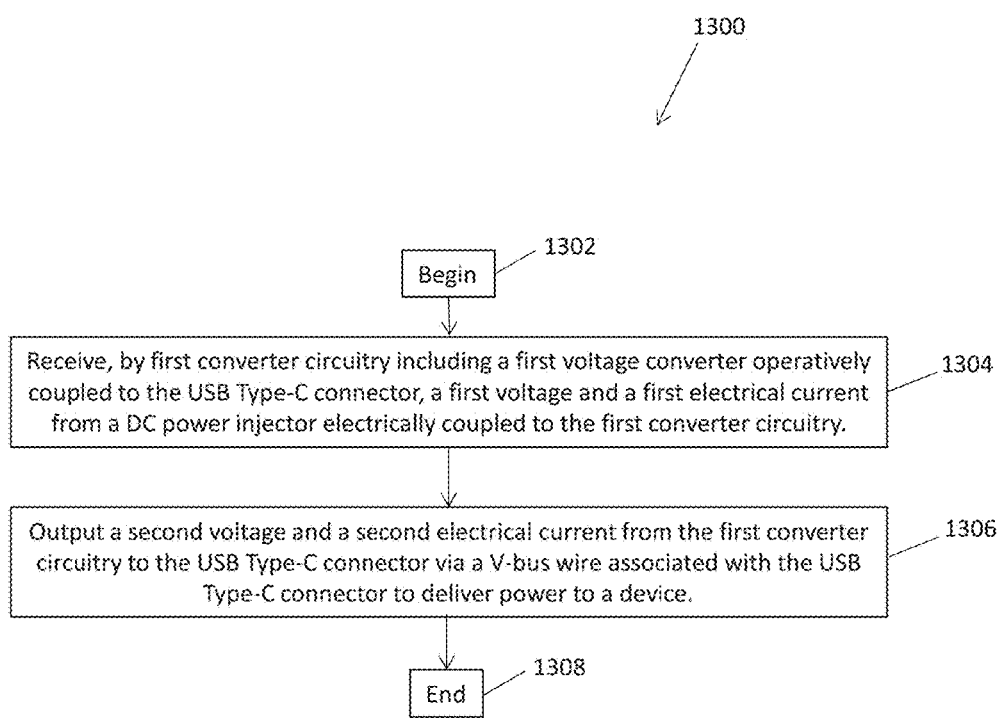
FIG. 13 is a flowchart of a non-limiting example power delivery process 1300 in accordance with embodiments of the present disclosure.

FIG. 13 is a flowchart of a non-limiting example power delivery process 1300 in accordance with embodiments of the present disclosure. In the process 1300 power can be delivered via a Universal Serial Bus cable having a USB Type-C connector at a first terminal end of the Universal Serial Bus cable and an USB Type-A connector at a second end of the Universal Serial Bus cable. The process begins at step 1302. At step 1304, a first voltage and a first electrical current is received by first converter circuitry including a first voltage converter operatively coupled to the USB Type-C connector from a DC power injector electrically coupled to the first converter circuitry. At step 1306, a second voltage and a second electrical current is output from the first converter circuitry to the USB Type-C connector via a V-bus wire associated with the USB Type-C connector to deliver power to a device. At step 1308, the process 1300 ends.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

The invention claimed is:

1. A Universal Serial Bus (USB) power delivery system comprising:
  a first USB Type-C connector;
  first converter circuitry, the first converter circuitry including:
    a first controller having a first electrical interface configured to electrically couple to a CC wire of the first USB Type-C connector, the first controller being configured to send and receive data via the first electrical interface; and
    a first voltage converter having an input and an output, the first voltage converter being configured to receive a first voltage at the input and to output a second voltage at the output, the input of the first voltage converter is configured to be electrically coupled to a V-bus wire of the first USB Type-C connector and the output of the first voltage converter is configured to be electrically coupled to a power transmission wire;
  a second USB Type-C connector;
  second converter circuitry, the second converter circuitry including:
    a second controller having a second electrical interface configured to electrically couple to a CC wire of the second USB Type-C connector, the second controller being configured to send and receive data via the second electrical interface; and
    a second voltage converter having an input and an output, the second voltage converter being configured to receive the second voltage at the input and to output a third voltage at the output, the input of the second voltage converter is electrically coupled to the power transmission wire to electrically couple the first and second voltage converters and the output of the first voltage converter is configured to be electrically coupled to a V-bus wire of the second USB Type-C connector,
  wherein the first and second converter circuitry are electrically disposed between the first and second USB Type-C connectors, and
  wherein the first USB Type-C connector is configured to electrically couple to a first device and the second USB Type-C connector is configured to electrically couple to a second device to electrically interpose the first and second converter circuitry between the first and second devices to facilitate power delivery from the first device to the second device via the first and second converter circuitry.

2. The system of claim 1, wherein the first voltage is greater than the second voltage.

3. The system of claim 1, wherein the second voltage is greater than the first voltage.

4. The system of claim 1, wherein the first controller further comprises:
  a third electrical interface configured to electrically couple to a CC communication channel, and the first controller is configured to send and receive data via the third electrical interface.

5. The system of claim 1, wherein the second controller comprises:
  a fourth electrical interface configured to be electrically coupled to a CC communication channel, the second controller being configured to send and receive data over the CC communication channel via the fourth electrical interface.

6. The system of claim 5, wherein the first converter circuitry is electrically coupled to the second converter circuitry via the CC communication channel and the power transmission wire.

7. The system of claim 5, wherein the second converter circuitry includes a DC/AC converter to convert the second voltage or the third voltage into an AC voltage, and the system further comprises:
  an AC outlet electrically coupled to the DC/AC converter.

8. The system of claim 5, further comprising:
  a jack electrically coupled to the second converter circuitry to provide a port through which a device is capable of receiving the second voltage or the third voltage derived from the first voltage or the second voltage.

9. The system of claim 8, wherein the second converter circuitry includes a DC/DC converter to convert the second voltage into a fourth voltage, and wherein the jack is electrically coupled to an output of the DC/DC converter.

10. The system of claim 5, wherein the second converter circuitry includes a DC power injector that supplies power on the power transmission wire.

11. The system of claim 1, wherein the power at the input of the first voltage converter is approximately equal to the power at the output of the first voltage converter.

12. The system of claim 1, wherein the first converter circuitry includes:
a third voltage converter; and
a first switching circuit to switch between the first voltage converter and the third voltage converter; and
wherein the second converter circuitry includes:
a fourth voltage converter; and
a second switching circuit to switch between the second voltage converter and the fourth voltage converter.

13. The system of claim 12, wherein first switching circuit is configured to (i) electrically couple the input of the first voltage converter to the V-bus wire of the USB Type-C connector and the output of the first voltage converter to the power transmission wire or to (ii) electrically couple the input of the third voltage converter to the power transmission wire and the output of the third voltage converter to the V-bus wire of the USB Type-C connector.

14. The system of claim 12, wherein the second switching circuit is configured to (i) electrically couple the input of the second voltage converter to the V-bus wire of the USB Type-C connector and the output of the second voltage converter to the power transmission wire or to (ii) electrically couple the input of the fourth voltage converter to the power transmission wire and the output of the fourth voltage converter to the V-bus wire of the USB Type-C connector.

15. The system of claim 1, wherein the first converter circuitry includes a DC power injector that supplies power on the power transmission wire.

16. A Universal Serial Bus (USB) power delivery system comprising:
first converter circuitry, the first converter circuitry including:
a first controller having a first electrical interface configured to electrically couple to a CC wire of a first USB Type-C connector, the first controller being configured to send and receive data via the first electrical interface; and
a first voltage converter having an input and an output, the first voltage converter being configured to receive a first voltage at the input and to output a second voltage at the output, the input of the first voltage converter is configured to be electrically coupled to a V-bus wire of the first USB Type-C connector and the output of the first voltage converter is configured to be electrically coupled to a power transmission wire;
second converter circuitry, the second converter circuitry including:
a second controller having a second electrical interface configured to electrically couple to a CC wire of a second USB Type-C connector, the second controller being configured to send and receive data via the second electrical interface; and
a second voltage converter having an input and an output, the second voltage converter being configured to receive the second voltage at the input and to output a third voltage at the output, the input of the second voltage converter is electrically coupled to the power transmission wire to electrically couple the first and second voltage converters and the output of the first voltage converter is configured to be electrically coupled to a V-bus wire of the second USB Type-C connector,
wherein the second controller comprises a fourth electrical interface configured to be electrically coupled to the CC communication channel, the second controller being configured to send and receive data over the CC communication channel via the fourth electrical interface,
wherein the first USB Type-C connector of the first converter circuitry is configured to couple to a first USB Type-C port of a first device and the second USB Type-C connector of the second converter circuitry is configured to couple to a second USB Type-C port of a second device, and
wherein the first voltage is received by the first voltage converter via the USB Type-C connector, the second voltage is output by the first voltage converter at a level that compensates for an impedance of the power transmission wire, and the second voltage converter converts the second voltage to the third voltage to provide a power specified by the second device.

17. A Universal Serial Bus (USB) power delivery system comprising:
first converter circuitry, the first converter circuitry including:
a first controller having a first electrical interface configured to electrically couple to a CC wire of a first USB Type-C connector, the first controller being configured to send and receive data via the first electrical interface; and
a first voltage converter having an input and an output, the first voltage converter being configured to receive a first voltage at the input and to output a second voltage at the output, the input of the first voltage converter is configured to be electrically coupled to a V-bus wire of the first USB Type-C connector and the output of the first voltage converter is configured to be electrically coupled to a power transmission wire;
second converter circuitry, the second converter circuitry including:
a second controller having a second electrical interface configured to electrically couple to a CC wire of a second USB Type-C connector, the second controller being configured to send and receive data via the second electrical interface; and
a second voltage converter having an input and an output, the second voltage converter being configured to receive the second voltage at the input and to output a third voltage at the output, the input of the second voltage converter is electrically coupled to the power transmission wire to electrically couple the first and second voltage converters and the output of the first voltage converter is configured to be electrically coupled to a V-bus wire of the second USB Type-C connector,
wherein the first controller is configured to communicate with the second controller to exchange information associated with power capabilities of a first device operatively coupled to the first converter circuitry, power needs of a second device operatively coupled to the second converter circuitry, and an expected loss power over the power transmission wire.

18. A method of delivering power via a Universal Serial Bus (USB) cable, the method comprising:
receiving, by first converter circuitry, a first voltage and a first electrical current from a first device electrically coupled to the first converter circuitry via a V-bus wire associated with a first USB connector;
outputting, from the first converter circuitry, a second voltage and a second electrical current on a power transmission wire, the second voltage being greater than the first voltage and the second electrical current being less than the first electrical current;

receiving, by second converter circuitry, the second voltage and the second electrical current via the power transmission wire; and outputting, from the second converter circuitry, a third voltage and a third electrical current to a second device via a V-bus wire associated with a second USB connector, wherein the first and second converter circuitry are electrically disposed between the first and second USB connector, and wherein the first USB connector is configured to electrically couple to the first device and the second USB connector is configured to electrically couple to the second device to electrically interpose the first and second converter circuitry between the first and second devices to facilitate power delivery from the first device to the second device via the first and second converter circuitry.

19. The method of claim 18, wherein the first converter circuitry includes a first voltage converter, a second voltage converter, and a switching circuit to switch between the first and second voltage converters and the second converter circuitry includes a third voltage converter, a fourth voltage converter, and second switching circuitry to switch between the third and fourth voltage converters, and the method further comprises:

controlling the first and second switching circuits to select the first and third voltage converters to facilitate power delivery to the second device from the first device via the first converter circuit, the power transmission wire, and the second converter circuit.

20. A method of delivering power via a Universal Serial Bus (USB) cable extension system, the method comprising:

receiving a connection of a first device to the USB extension cable system, the USB cable extension system having a USB Type-C connector at a first terminal end of a USB cable and an USB Type-A connector at a second end of the USB cable, the USB Type-C connector connects the USB extension cable system to the first device;

receiving a connection of a second device to the USB extension cable system, the USB Type-A connector at the second terminal end of the USB cable connects the USB extension cable system to the second device, the first and second device being electrically coupled via a data bus of the USB cable;

receiving, by a first voltage converter of first converter circuitry in the USB cable extension system, a first voltage and a first electrical current from a DC power injector, the first voltage converter being electrically coupled between the DC power injector and the USB Type-C connector;

advertising a power profile from the first converter circuitry to the first device via the USB cable and the USB Type-C connector; and outputting, from the first converter circuitry to the USB Type-C connector via a V-bus wire of the USB cable, a second voltage and a second electrical current according to the power profile.

* * * * *